US 9,651,393 B2

(12) United States Patent
Takahashi

(10) Patent No.: US 9,651,393 B2
(45) Date of Patent: May 16, 2017

(54) DRIVING SUPPORT DEVICE, DRIVING SUPPORT METHOD, AND RECORDING MEDIUM STORING DRIVING SUPPORT PROGRAM

(71) Applicant: NEC Corporation, Minato-ku, Tokyo (JP)

(72) Inventor: Katsuhiko Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/759,719

(22) PCT Filed: Jan. 27, 2014

(86) PCT No.: PCT/JP2014/000375
§ 371 (c)(1),
(2) Date: Jul. 8, 2015

(87) PCT Pub. No.: WO2014/115563
PCT Pub. Date: Jul. 31, 2014

(65) Prior Publication Data
US 2015/0345974 A1 Dec. 3, 2015

(30) Foreign Application Priority Data
Jan. 28, 2013 (JP) ................. 2013-013312

(51) Int. Cl.
*G01C 21/00* (2006.01)
*G01C 21/36* (2006.01)
(Continued)

(52) U.S. Cl.
CPC ......... *G01C 21/3602* (2013.01); *B60W 50/14* (2013.01); *G06K 9/00818* (2013.01); *B60W 2050/146* (2013.01); *B60W 2550/22* (2013.01)

(58) Field of Classification Search
CPC ................ G01C 21/3602; B60W 50/14
See application file for complete search history.

(56) References Cited

U.S. PATENT DOCUMENTS 6,801,638 B1* 10/2004 Janssen ............... B60K 35/00
340/910
2006/0034484 A1* 2/2006 Bahlmann .......... G06K 9/00818
382/103
(Continued)

FOREIGN PATENT DOCUMENTS

JP 9-73700 A 3/1997
JP 10-185607 A 7/1998
(Continued)

OTHER PUBLICATIONS

International Search Report for PCT Application No. PCT/JP2014/000375, mailed on Mar. 11, 2014.
(Continued)

*Primary Examiner* — Adam Alharbi

(57) ABSTRACT

To provide a driving support device that, when a vehicle approaches signs arranged in the vicinity of a plurality of roads, provides information of a sign that targets at a road on which the vehicle travels, and suppresses provision of information of a sign that does not target at the road on which the vehicle travels.
The driving support device of the present invention includes: sign recognition means for detecting a sign from a video acquired from an imaging device mounted to a vehicle that travels on a road, and recognizing information represented by a detected sign that is the sign detected and a first relative position that is a relative position of the detected sign to the road; map data storage means for storing a second relative position that is a relative position of the sign to the road; sign position determination means for determining conformity of the detected sign and a map sign that is the sign whose second relative position the map data storage means stores by determining if the second relative position and the first relative position conform; and output means for outputting
(Continued)

the information that the detected sign represents, when it is determined that the detected sign and the map sign conform.

9 Claims, 13 Drawing Sheets

(51) Int. Cl.
*G06K 9/00* (2006.01)
*B60W 50/14* (2012.01)

(56) References Cited

U.S. PATENT DOCUMENTS

| | | |
|---|---|---|
| 2008/0056535 A1 | 3/2008 | Bergmann et al. |
| 2010/0103040 A1* | 4/2010 | Broadbent ............ G01S 19/48 342/357.28 |
| 2010/0302361 A1 | 12/2010 | Yoneyama et al. |

FOREIGN PATENT DOCUMENTS

| | | |
|---|---|---|
| JP | 2000-346653 A | 12/2000 |
| JP | 2002-243469 A | 8/2002 |
| JP | 2005-106722 A | 4/2005 |
| JP | 2005-128790 A | 5/2005 |
| JP | 2007-322283 A | 12/2007 |
| JP | 2010-519550 A | 6/2010 |

OTHER PUBLICATIONS

English translation for Written opinion of PCT Application No. PCT/JP2014/000375.

M. A. Garcia-Garrido et al., "Robust Traffic Signs Detection by means of Vision and V2I Communications", 2011 14th International IEEE Conference on Intelligent Transportation Systems, Washington, DC, USA, XP032023239, Oct. 5-7, 2011, pp. 1003-1008.

Extended European Search Report for EP Application No. EP14743214.0 dated on Oct. 14, 2016.

\* cited by examiner

Fig. 5

| SIGN ID | ABSOLUTE POSITION | | TYPE | ROAD ID | RELATIVE POSITION |
| --- | --- | --- | --- | --- | --- |
| | LATITUDE | LONGITUDE | | | |
| A | 35.750 | 139.843 | MAXIMUM SPEED 30km/h | 100000 | LEFT |
| B | 35.751 | 139.745 | MAXIMUM SPEED 40km/h | 100000 | RIGHT |
| C | 35.751 | 139.742 | MAXIMUM SPEED 50km/h | 100000 | LEFT |
| D | 35.752 | 139.742 | MAXIMUM SPEED 70km/h | 100001 | LEFT |
| E | 35.752 | 139.740 | MAXIMUM SPEED 70km/h | 100001 | LEFT |
| F | 35.752 | 139.747 | MAXIMUM SPEED 70km/h | 100002 | LEFT |

| ABSOLUTE POSITION | LATITUDE | 35.751 |
|---|---|---|
| | LONGITUDE | 139.745 |
| TYPE | | MAXIMUM SPEED 40km/h |
| ROAD ID | | 100000 |
| RELATIVE POSITION | | RIGHT |

Fig. 8

| SIGN ID | ABSOLUTE POSITION | | TYPE | ROAD ID | RELATIVE POSITION | |
|---|---|---|---|---|---|---|
| | LATITUDE | LONGITUDE | | | DIRECTION | DISTANCE |
| A | 35.750 | 139.843 | MAXIMUM SPEED 30km/h | 100000 | LEFT | 1.0 |
| B | 35.751 | 139.745 | MAXIMUM SPEED 40km/h | 100000 | RIGHT | 1.2 |
| C | 35.751 | 139.742 | MAXIMUM SPEED 50km/h | 100000 | LEFT | 1.1 |
| D | 35.752 | 139.742 | MAXIMUM SPEED 70km/h | 100001 | LEFT | 1.0 |
| E | 35.752 | 139.740 | MAXIMUM SPEED 70km/h | 100001 | LEFT | 0.8 |
| F | 35.752 | 139.747 | MAXIMUM SPEED 70km/h | 100002 | LEFT | 1.3 |

DRIVING SUPPORT DEVICE, DRIVING SUPPORT METHOD, AND RECORDING MEDIUM STORING DRIVING SUPPORT PROGRAM

This application is a National Stage Entry of PCT/JP2014/000375 filed on Jan. 27, 2014, which claims priority from Japanese Patent Application 2013-013312 filed on Jan. 28, 2013, the contents of all of which are incorporated herein by reference, in their entirety.

TECHNICAL FIELD

The present invention relates to a driving support device, a driving support method, and a recording medium storing a driving support program. The present invention relates to, in particular, a driving support device, a driving support method, and a recording medium storing a driving support program, in a vehicle that mounts an imaging device.

BACKGROUND ART

A driving support device that provides information of a traffic sign arranged at a road on which a vehicle travels is described in Patent Literatures 1 to 3, for example.

A device described in Patent Literature 1 recognizes a speed limit, on the basis of a traffic sign or a road marking included in a video of a scene ahead of a vehicle, which is imaged by a vehicle-mounted camera. Then, when a vehicle speed obtained from the vehicle exceeds the recognized speed limit, the device disclosed in Patent Literature 1 outputs an alarm.

A navigation system described in Patent Literature 2 estimates a road on which a vehicle travels, on the basis of a position of the vehicle detected by using a GPS (Global Positioning System) and road data which is stored in a road data storage means. The road data storage means also stores a speed limit of roads in addition to the data of the position of the roads. Then, the navigation system retrieves the speed limit on the road on which the vehicle is estimated to travel, from the road data storage means. When a speed outputted from a vehicle speed sensor exceeds the retrieved speed limit, the navigation system outputs an alarm.

A navigation device disclosed in Patent Literature 3 holds coordinates of a characteristic object, such as a building, separately for users. Then, the navigation device estimates a road on which a vehicle travels, on the basis of a current position of the vehicle obtained by using a GPS and map data. The navigation device determines whether the characteristic object is the right side or the left side relative to the road on which the vehicle travels in a traveling direction of the vehicle, on the basis of the coordinates of the characteristic object, the current position, and the traveling direction. When the vehicle approaches the characteristic object, the navigation device outputs a result of the determination.

Patent Literature 4 describes a map database updating system that updates a map database by using a result of checking of a type and a position of a traffic sign derived from a video of a camera mounted to a vehicle against a traffic sign over the map database. A navigation device included in the map database updating system recognizes the type of the traffic sign and a relative position relationship, such as a distance and a direction, of the traffic sign to the camera, on the basis of the video of the camera mounted to the vehicle. Then, the navigation device calculates the position of the traffic sign, on the basis of the relative position relationship of the traffic sign to the camera and a position and a direction of the vehicle measured by using a GPS, a sensor, and the like. When the calculated position of the traffic sign and contents included in the map database are different, the map database updating system changes the position of the traffic sign in the map database to the calculated position.

CITATION LIST

Patent Literature

PTL 1: Japanese Unexamined Patent Application Publication No. 2005-128790
PTL 2: Japanese Unexamined Patent Application Publication No. H09-073700
PTL 3: Japanese Unexamined Patent Application Publication No. H10-185607
PTL 4: Japanese Unexamined Patent Application Publication No. 2002-243469

SUMMARY OF INVENTION

Technical Problem

In the vicinity of plural roads, a traffic sign that does not target at least one of the roads is sometimes arranged. Examples of such a traffic sign include a traffic sign that targets only one road, which is arranged at a branch point of roads or at the center of adjacent two roads in the same direction.

In such a case, the devices disclosed in Patent Literature 1 to 4 cannot distinguish whether or not a traffic sign adjacent to a plurality of roads including a road on which a vehicle travels targets at the road on which the vehicle travels. Therefore, when a position of the vehicle and a position of the traffic sign are specified by using the techniques of Patent Literatures 1 to 4 to provide information of a traffic sign near the vehicle, information of a traffic sign that does not target at the road on which the vehicle travels may be erroneously provided.

For example, in the techniques disclosed in Patent Literature 1 and Patent Literature 4, when a traffic sign is recognized in a video imaged by a vehicle-mounted camera, traffic signs within a range to be imaged are all targets of recognition. The imaged traffic sign is a target of recognition, even if the traffic sign is a traffic sign that does not target at the road on which the vehicle travels. Therefore, in the case of providing information of the recognized traffic signs to a driver of the vehicle, when a traffic sign that does not target at the road on which the vehicle travels is included in a camera-imaging range, information of the traffic sign is provided to the driver.

For example, the devices disclosed in Patent Literature 2 and Patent Literature 3 estimate a road on which a vehicle travels, on the basis of a measurement result of a position of the vehicle and map data. The device disclosed in Patent Literature 2 outputs a speed limit of the road on which the vehicle is estimated to travel. The device of Patent Literature 3 outputs relative position information of a characteristic object, which is adjacent to the road on which the vehicle is estimated to travel, to the road. However, the measurement result of the position of the vehicle includes an accidental error. Thus, when there are a plurality of adjacent roads, the devices disclosed in Patent Literature 2 and Patent Literature 3 may estimate that the vehicle travels on a road on which the vehicle does not actually travel. Therefore, the device disclosed in Patent Literature 2 may output a speed limit of a road on which the vehicle does not travel. In addition, the device disclosed in Patent Literature 3 may output relative position information of a characteristic object, which is adjacent to a road on which the vehicle does not travel, to the road.

It is an object of the present invention to provide a driving support device that, when a vehicle approaches a sign arranged in the vicinity of plural roads, provides information of the sign that targets at a road on which the vehicle travels, and suppresses provision of information of the sign that does not target at the road on which the vehicle travels.

Solution to Problem

A driving support device according to the present invention includes: sign recognition means for detecting a sign from a video acquired from an imaging device mounted to a vehicle that travels on a road, and recognizing information represented by a detected sign that is the sign detected and a first relative position that is a relative position of the detected sign to the road; map data storage means for storing a second relative position that is a relative position of the sign relative to the road; sign position determination means for determining conformity of the detected sign and a map sign that is the sign whose second relative position the map data storage means stores by determining if the second relative position and the first relative position conform; and output means for outputting the information that the detected sign represents, when it is determined that the detected sign and the map sign conform.

A driving support method according to the present invention includes: acquiring a video from an imaging device mounted to a vehicle that travels on a road; detecting a sign from the video and recognizing information represented by a detected sign that is the sign detected and a first relative position that is a relative position of the detected sign to the road; storing a second relative position that is a relative position of the sign to the road, in a map data storage means; determining conformity of the detected sign and a map sign that is the sign whose second relative position the map data storage means stores by determining if the second relative position and the first relative position conform; and outputting the information that the detected sign represents, when it is determined that the detected sign and the map sign conform.

A recording medium according to the present invention stores a driving support program that makes a computer operate as: sign recognition means for detecting a sign from a video acquired from an imaging device mounted to a vehicle that travels on a road, and recognizing information represented by a detected sign that is the sign detected and a first relative position that is a relative position of the detected sign to the road; map data storage means for storing a second relative position that is a relative position of the sign to the road; a sign position determination means for determining conformity of the detected sign and a map sign that is the sign whose second relative position the map data storage means stores by determining if the second relative position and the first relative position conform; and output means for outputting information that the detected sign represents, when it is determined that the detected sign and the map sign conform.

The present invention can also be achieved by a driving support program stored in the recording medium.

Advantageous Effects of Invention

When a vehicle approaches a sign arranged in the vicinity of a plurality of roads, the present invention has an effect of being capable of selectively outputting information of the sign that targets at a road on which the vehicle travels.

BRIEF DESCRIPTION OF DRAWINGS

FIG. 5 is a diagram illustrating an example of data of signs that map data stores, which are arranged within a prefixed distance from a position measured by a position measurement unit 15.

FIG. 8 is a diagram illustrating an example of sign data that the map data storage unit 12 stores.

DESCRIPTION OF EMBODIMENTS

Next, exemplary embodiments of the present invention will be described in detail with reference to the drawings.

First Exemplary Embodiment

Figure 1:
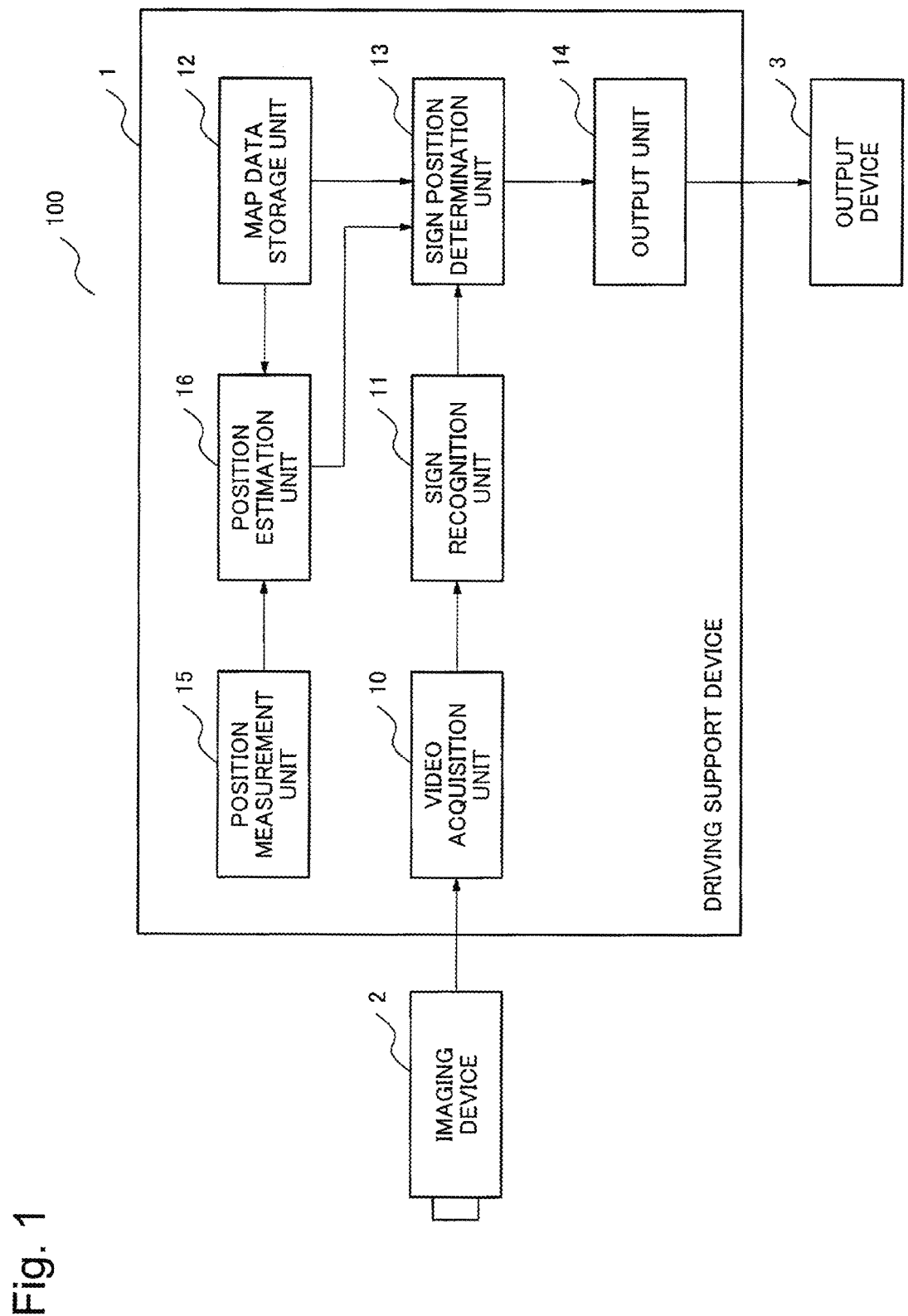
FIG. 1 is a diagram illustrating an example of a structure of a driving support system 100 of first, second, and third exemplary embodiments.

FIG. 1 is a diagram illustrating an example of a structure of a driving support system 100 of a first exemplary embodiment of the present invention.

Referring to FIG. 1, the driving support system 100 includes a driving support device 1, an imaging device 2, and an output device 3.

The imaging device 2 is a camera mounted to a vehicle. The imaging device 2 images a video of a scene ahead of the vehicle. The imaging device 2 is mounted to the vehicle such that a range including the roadside ahead of the vehicle is included in the imaged range. The imaging device 2 transmits the imaged video to the driving support device 1. The driving support device 1 and the imaging device 2 are implemented such that the transmission of the video that the imaging device 2 images to the driving support device 1 is possible. The driving support device 1 and the imaging device 2 may be connected by a cable, for example. The driving support device 1 and the imaging device 2 may be able to communicate by wireless communication.

Examples of the output device 3 include a display device, an audio output device, and a display device equipped with a speaker. The display device is a display that displays an image and a video, or the like. The audio output device is a speaker that outputs an audio, or the like. The display device equipped with a speaker outputs an audio in addition to an image and a video.

The driving support device 1 includes a video acquisition unit 10, a sign recognition unit 11, a map data storage unit 12, a sign position determination unit 13, an output unit 14, a position measurement unit 15, and a position estimation unit 16.

The video acquisition unit 10 acquires the video that the imaging device 2 images, from the imaging device 2. For example, the video acquisition unit 10 acquires digital data of the video that the imaging device 2 images, from the imaging device 2.

The sign recognition unit 11 detects a sign in the video acquired from the video acquisition unit 10. The sign is a traffic sign, for example. For example, the traffic sign is represented by a character, a graphic, a combination of a character and a graphic, or the like. The sign recognition unit 11 recognizes information that the detected sign represents. In the description of each of the exemplary embodiments according to the present invention, the sign detected in the video, by the sign recognition unit 11, is also referred to as a detected sign. The information that the sign represents is a type of the sign, for example. In addition, the sign recognition unit 11 recognizes a relative position of the detected sign to the road on which the vehicle to which the imaging device 2 is mounted travels, on the basis of the video acquired from the video acquisition unit 10 (i.e., the video that the imaging device 2 images). For example, the relative position of the sign to the road indicates that the sign exists on the right or exists on the left of the road in a prefixed direction of the road. In each of the exemplary embodiments according to the present invention, the relative position of the detected sign to the road is also referred to as a first relative position. The sign recognition unit 11 recognizes whether the detected sign exists on the right or exists on the left of the road on which the vehicle to which the imaging device 2 is mounted travels, in a traveling direction of the vehicle to which the imaging device 2 is mounted, as the first relative position. Therefore, in the present exemplary embodiment, the first relative position indicates that the detected sign exists on the right or exists on the left of the road on which the vehicle to which the imaging device 2 is mounted travels, in the traveling direction of the vehicle to which the imaging device 2 is mounted.

The map data storage unit 12 stores road data including shapes and positions of roads, and sign data including positions and types of signs. For example, roads are represented by a combination of line segments. A line segment is represented by two edge points. Those line segments may be directed. In this case, one edge point of two edge points may be stored as a starting point and the other edge point may be stored as an ending point. The road data is data including coordinates of a starting point and coordinates of an ending point of each of the line segments, for example. The positions of the roads and the positions of the signs that the map data storage unit 12 stores are represented by a common coordinate system, such as latitude and longitude. The position represented by the common coordinate system, such as latitude and longitude, is also referred to as an absolute position. In the description of each of the exemplary embodiments according to the present invention, coordinates representing the absolute position is also referred to as absolute coordinates. The sign data further includes a road identifier of a road at which a sign targets, and a relative position between the sign and the road at which the sign targets. The road identifier is also referred to as a road ID. In the description of each of the exemplary embodiments according to the present invention, the sign represented by the sign data that the map data storage unit 12 stores is also referred to as a map sign. For example, a relative position between the map sign and the road at which the map sign targets indicates that the position of the sign is on the left side or the right side in a direction of the road specified by the starting point and the ending point of the line segment representing the road. In the description of each of the exemplary embodiments of the present invention, for example, in the sign data that the map data storage unit 12 stores, the relative position of the map sign to the road is also referred to as a second relative position. When one map sign targets at a plurality of roads, for the map sign, the map data storage unit 12 may store the second relative positions to those plurality of roads.

As described above, for each line segment of the roads approximated by the combination of a plurality of line segments, the map data storage unit 12 may store a combination of the coordinates of the two edge points of the line segment and the identifier of the line segment, as the road data, for example. The coordinates of the edge points are latitude and longitude, for example. As described above, the map data storage unit 12 may store one of the two edge points as the starting point and the other as the ending point. The direction of the line segment is a direction from the starting point to the ending point. The direction of the line segment may have no relationship to the traveling direction of the vehicle on the road that the line segment represents. The identifier of the line segment may be the above-described road identifier that is also referred to as the road ID, for example. For each of the signs, the map data storage unit 12 may store a combination of the identifier of the sign, the coordinates of the place where the sign is arranged, the type of the sign, the road ID of the road at which the sign targets, and the relative position of the sign and the road at which the sign targets, as the sign data, for example. The coordinate of the place where the sign is arranged is represented by latitude and longitude, for example. As described above, the relative position of the sign and the road at which the sign targets may be data that indicates whether the place where the sign is arranged is the left side or the right side in the direction of the line segment representing the road, for example.

The position measurement unit 15 measures the absolute position of the vehicle using a GPS, for example. As described above, the absolute position is represented by latitude and longitude, for example. A position that is simply referred to as "position" represents the absolute position. As a measurement method of the position of the vehicle by the position measurement unit 15, a variety of existing methods can be used. The position measurement unit 15 may measure the position of the vehicle by a method without using a GPS. The position measurement unit 15 may measure the position of the vehicle using radio field strength from a wireless base station, for example.

The position estimation unit 16 estimates the road on which the vehicle travels, on the basis of the position of the vehicle that the position measurement unit 15 measures and the road data that the map data storage unit 12 stores. The position estimation unit 16 estimates the position of the place where the vehicle exists on the road and the traveling direction of the vehicle.

The sign position determination unit 13 extracts signs whose distances from the position of the vehicle estimated by the position estimation unit 16 do not exceed a preset distance, among signs whose sign coordinates the map data storage unit 12 stores. The sign position determination unit 13 may further extract signs having the same type as the type of the sign detected from the video, from the extracted signs. As described above, the sign whose sign coordinates is stored in the map data storage unit 12 is the above-described map sign. The relative position of the map sign to the road is also referred to as the second relative position of the map sign to the road. For example, the sign position determination unit 13 specifies the second relative position of the map sign to the road at which the extracted map sign targets. For example, the sign position determination unit 13 may retrieve the second relative position of the extracted map sign that the map data storage unit 12 stores. As described above, the sign that is detected in the video by the sign recognition unit 11 is the detected sign. The relative position of the detected sign to the road is also referred to as the first relative position. In addition, the video from which the detected sign is detected is imaged by the imaging device 2 mounted to the vehicle, for example. As described above, for example, the sign recognition unit 11 derives the first relative position of the detected image to the road on which the vehicle travels, the imaging device 2 that images the video is mounted to the vehicle, and the detected image is detected from the video. The sign position determination unit 13 determines whether or not the first relative position of the detected sign corresponds to the second relative position of the extracted map sign. When the first relative position of the detected sign corresponds to the second relative position of the map sign, the sign position determination unit 13 determines that the detected sign and the map sign conform.

When the map sign that conforms to the detected sign exists, the output unit 14 outputs the information that the detected sign represents. The output unit 14 may output the information that the detected sign represents when a difference between a distance from the arrangement place of the map sign that conforms to the detected sign to the road at which the map sign targets and a distance from the arrangement place of the detected sign to the road on which the vehicle travels does not exceed a preset value. In this case, for example, the sign recognition unit 11 may estimate a difference of the distance from the arrangement place of the detected sign to the road on which the vehicle travels. The sign recognition unit 11 may calculate, for example, a distance from the detected sign to an optical axis of the imaging device 2, as the distance from the arrangement place of the detected sign to the road on which the vehicle travels.

The output device 3 outputs the information that the sign represents, which is received from the output unit 14, and other data, as an audio, an image, and a video.

Figure 2:
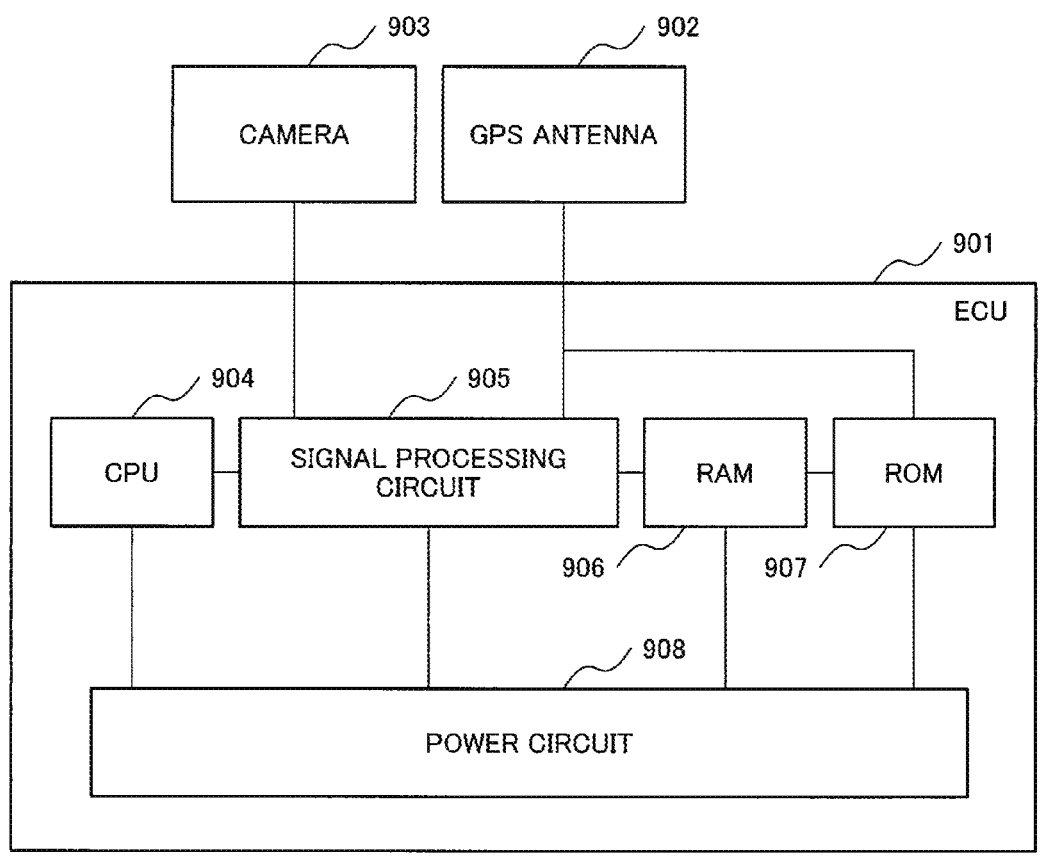
FIG. 2 is a diagram illustrating an example of a physical structure of the driving support device system 100.

FIG. 2 is a diagram illustrating an example of a physical structure of the driving support device system 100.

The driving support device system 100 includes an ECU 901 (Electronic Control Unit), a GPS antenna 902, and a camera 903. The ECU 901 includes a CPU 904 (Central Processing Unit), a signal processing circuit 905, a RAM 906 (Random Access Memory), a ROM 907 (Read Only Memory), and a power circuit 908. The CPU 904 can access the signal processing circuit 905, the RAM 906, and the ROM 907.

The camera 903 operates as the imaging device 2. The signal processing circuit 905 operates as the video acquisition unit 10. The GPS antenna 902 and the signal processing circuit 905 operate as the position measurement unit 15. At least one of the RAM 906 and the ROM 907 operates as the map data storage unit 12. In addition, for example, by executing a program stored in the ROM 907, the CPU 904, the RAM 906, and the ROM 907 operate as the sign recognition unit 11, the sign position determination unit 13, the output unit 14, and the position estimation unit 16.

Next, an operation of the driving support device 1 of the present exemplary embodiment will be described in detail with reference to the drawings.

Figure 3:
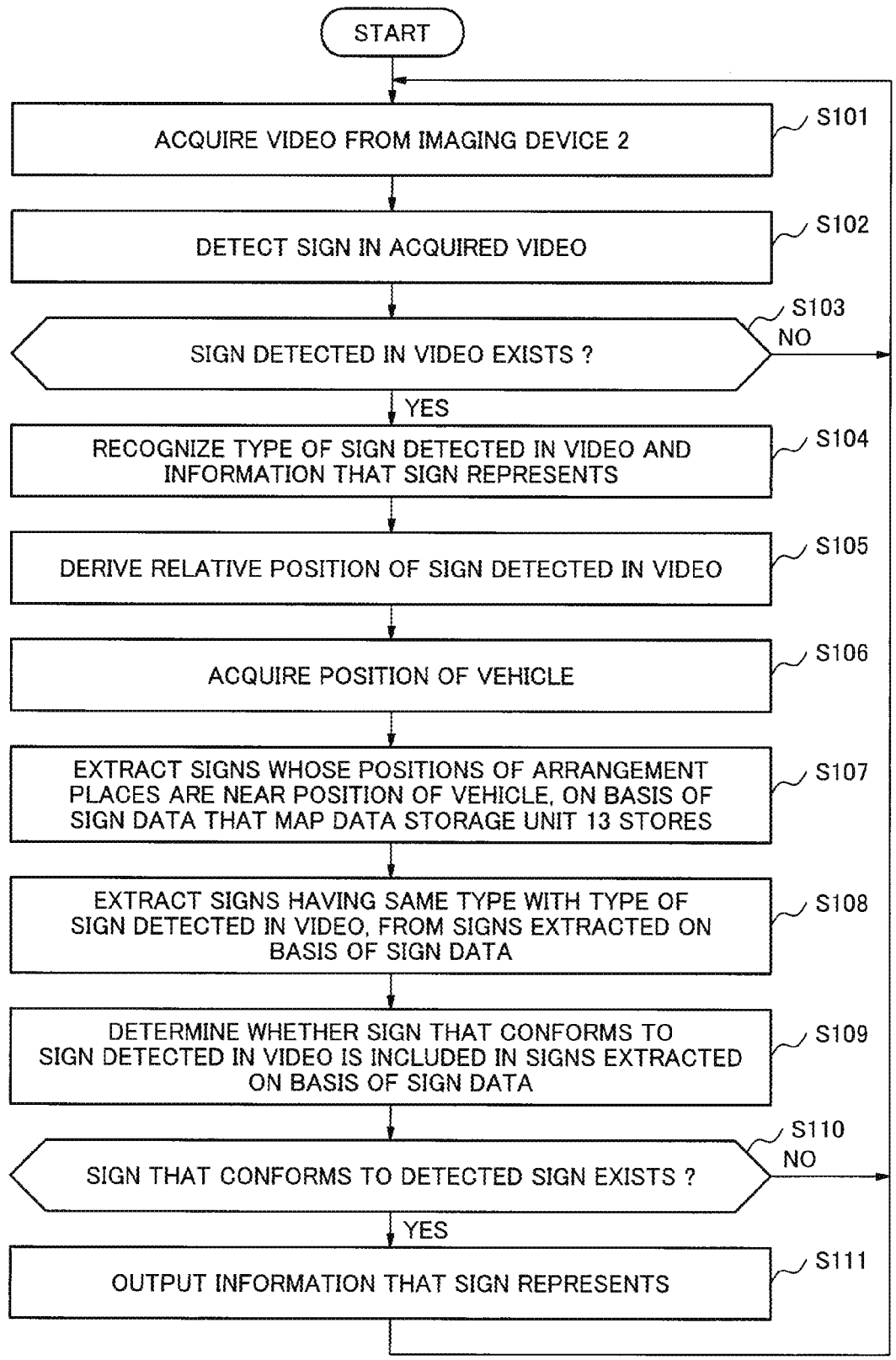
FIG. 3 is a flowchart illustrating an example of an operation of a driving support device 1 of the present exemplary embodiment.

FIG. 3 is a flowchart illustrating an example of the operation of the driving support device 1 of the present exemplary embodiment.

Firstly, the video acquisition unit 10 acquires a video from the imaging device 2 (Step S101).

For example, the video acquisition unit 10 acquires digital data of the video that the imaging device 2 images. The video acquisition unit 10 may acquire a frame of the video that the imaging device 2 images, from the imaging device 2, as a still image. For example, the video acquisition unit 10 may acquire an analog signal of the video that the imaging device 2 images, from the imaging device 2. Then, the video acquisition unit 10 may convert the analog signal of the video to digital data.

Next, the sign recognition unit 11 detects a sign from the video that the video acquisition unit 10 acquires (Step S102).

As described above, the imaging device 2 images a video of a scene ahead of the vehicle. The imaging device 2 is mounted to the vehicle such that a range including the roadside ahead of the vehicle is included in the imaged range. If a sign is arranged at a place included in the imaged range, on the roadside ahead of the vehicle, an image of the sign is included in the video that the imaging device 2 images.

When the sign is not detected from the video (No in Step S103), the operation of the driving support device 1 returns to Step S101.

When the sign is detected from the video (Yes in Step S103), the sign recognition unit 11 recognizes a type of the detected sign and information that the sign represents (Step S104).

As a recognition method of the sign by the sign recognition unit 11, a variety of existing methods are applicable. For example, the sign recognition unit 11 may recognize the type of the sign by performing template matching after correcting a shape of a region of the detected sign. When a plurality of signs are detected, the sign recognition unit 11 recognizes the types of all the detected signs. Examples of the type of the sign include a maximum speed sign of each of a plurality of speeds, such as a maximum speed sign of maximum speed of 100 km/h (kilometer per hour), and information that represents the type of the sign, such as a stop sign and a parking prohibition sign. The type of the sign may be represented by a code that is correlated to the above-described type of the sign in advance. In addition, for example, the map data storage unit 12 may hold information that the sign represents, for example, the maximum speed is 100 km/h, a temporary stop is necessary, parking is prohibited, and the like, for each type of the sign. Then, the sign recognition unit 11 may retrieve the information that the sign represents, which corresponds to the recognized type of the sign, from the map data storage unit 12. When the sign includes character information, such as a day and time, the sign recognition unit 11 may recognize the information that the sign represents by character recognition.

The sign recognition unit 11 may perform recognition of the sign by a recognition method of a traffic sign, which is described, for example, in Japanese Unexamined Patent Application Publication No. S62-108396.

Figure 4:
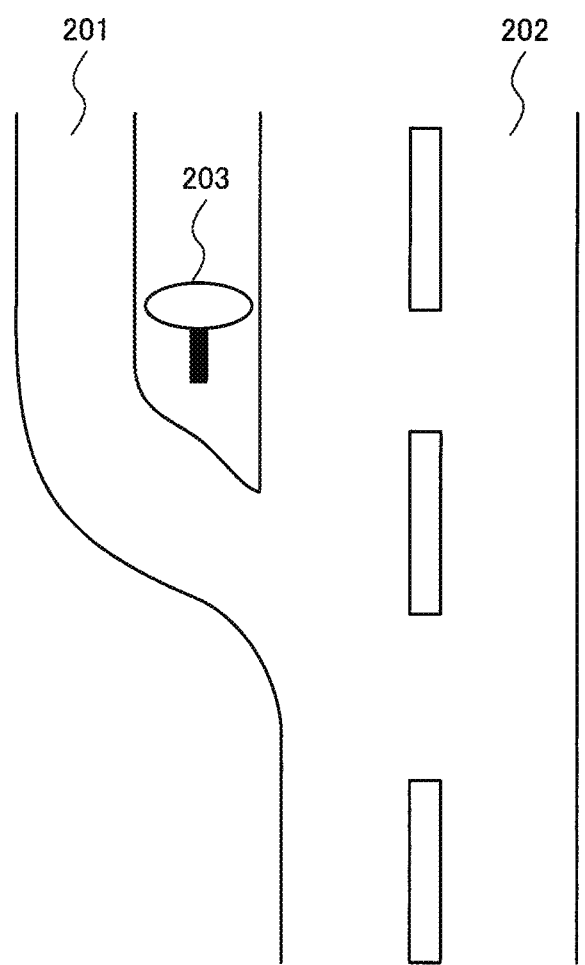
FIG. 4 is a diagram illustrating an example of arrangement of a road and a sign.

FIG. 4 is a diagram illustrating an example of arrangement of a road and a sign. In the example of FIG. 4, a sign 203 is arranged near a branch point of a road 201 and a road 202. In the example of FIG. 4, the sign 203 is a sign that targets at the road 201.

For example, in the arrangement shown in FIG. 4, when a vehicle travels on the road 201 or the road 202 below the sign 203 in a direction from the lower side to the upper side of FIG. 4, an image of the sign 203 is included in the video that the video acquisition unit 10 acquires from the imaging device 2 mounted to the vehicle. The sign detection unit 11 detects a region of the image of the sign 203 from the video that the video acquisition unit 10 acquires. When the sign 203 is a sign that indicates that the maximum speed is 40 km/h, by performing recognition of the type for the detected region, the sign recognition unit 11 recognizes that the type of the sign is "maximum speed 40 km/h".

In addition, the sign recognition unit 11 derives a relative position of the sign detected from the video, on the basis of the video (Step S105). The relative position that the sign recognition unit 11 derives in Step S105 is a relative position of the sign detected from the video to the road on which the vehicle travels, in the traveling direction of the vehicle to which the imaging device 2 that images the video is mounted. As described above, the above-described relative position that the sign recognition unit 11 derives in Step S105 is also referred to as the first relative position.

The sign recognition unit 11 estimates the first relative position, for example, as follows.

For example, the sign recognition unit 11 may recognize whether the place where the sign is detected is the right side or the left side of a preset reference set in the video, as the relative position. The preset reference may be a line that is set in the video in advance and is not horizontal, for example. The preset reference may be a line segment which is set in the video in advance and on which a vertical plane that passes through a camera center of the imaging device 2 and is parallel to the front direction of the vehicle is mapped. The preset reference may be a region of the road in the video, which is recognized using any of existing road region recognition methods by the sign recognition unit 11, for example.

In the example of FIG. 4, when the vehicle travels on the road 202, the sign 203 exists on the left side of the road 202 on which the vehicle travels. In this case, when the sign recognition unit 11 derives the relative position of the sign with reference to a line segment in the video, the direction of which corresponds to the front direction of the vehicle, for example, the sign recognition unit 11 derives "left" as the relative position of the sign 203. When the vehicle travels on the road 201, the sign 203 exists on the right side of the road 201 on which the vehicle travels. Therefore, the sign recognition unit 11 derives "right" as the relative position of the sign 203.

Next, the sign position determination unit 13 acquires a position of the vehicle from the position estimation unit 16, for example (Step S106).

The position of the vehicle, which the sign position determination unit 13 acquires, is latitude and longitude that the position measurement unit 15 measures using a GPS, for example. The sign position determination unit 13 may acquire latitude and longitude after the position estimation unit 16 performs a correction for the latitude and longitude that the position measurement unit 15 measures. The correction by the position estimation unit 16 is a correction which is performed by an ordinary navigation device, in which, for example, the road on which the vehicle travels is estimated using map data stored in the map data storage unit 12, and the position of the traveling vehicle is revised so as to be on the estimated road. The position measurement unit 15 may further measure an orientation of the vehicle by, for example, an orientation sensor. Then, the sign position determination unit 13 may acquire latitude, longitude, and an orientation, as the position of the vehicle.

The sign position determination unit 13 extracts signs whose arrangement places are near the acquired position of the vehicle, from signs whose sign data the map data storage unit 12 stores (Step S107).

The sign position determination unit 13 extracts signs arranged within, for example, a preset distance from the acquired position of the vehicle. The above-described preset distance may be a distance that is preset on the basis of, for example, accuracy of the GPS and a camera parameter of the imaging device 2.

When the latitude and longitude that the position measurement unit 15 measures are, for example, 35.75 and 139.74, respectively, the sign position determination unit 13 extracts signs arranged within a preset distance from the position represented by these latitude and longitude.

FIG. 5 is a diagram illustrating an example of data of signs that map data stores, which are arranged within a preset distance from the position measured by the position measurement unit 15.

The sign position determination unit 13 further extracts signs having the same type as the type of the sign detected in the video, from the signs extracted on the basis of the sign data that the map data storage unit 12 stores (Step S108).

When the kind of the detected sign that the sign recognition unit 11 recognizes is, for example, "maximum speed 40 km/h", the sign position determination unit 13 further extracts signs having the type of "maximum speed 40 km/h", from the extracted signs.

Figures 6, 7:
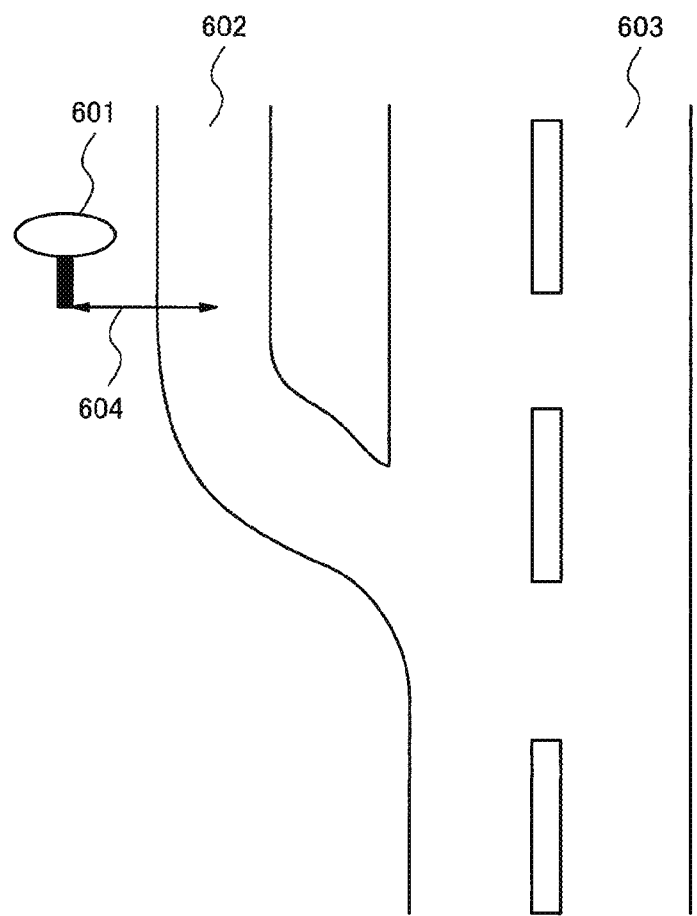
FIG. 6 is a diagram illustrating an example of data of an extracted sign.
FIG. 7 is a diagram illustrating an example of arrangement of a road and a sign.

FIG. 6 is a diagram illustrating data of the extracted sign. When data of the signs extracted in Step S107 is sign data of the signs shown in FIG. 5, the sign position determination unit 13 extracts sign data shown in FIG. 6 from the sign data of FIG. 5. More specifically, the sign position determination unit 13 extracts a sign represented by the sign data shown in FIG. 6.

Next, the sign position determination unit 13 determines whether or not a sign that conforms to the sign detected in the video is included in the signs extracted on the basis of the sign data (Step S109). As described above, the signs extracted on the basis of the sign data are map signs extracted by the sign position determination unit 13, from map signs represented by the sign data stored in the map data storage unit 12. The sign detected in the video is a detected sign that the sign recognition unit 11 detects in the video that the imaging device 2 images.

The sign position determination unit 13 may perform determination of conformity by comparing the relative position of the sign that the sign recognition unit 11 detects to the road on which the vehicle travels with the relative position of the extracted sign to the road at which the sign targets. As described above, the sign data that the map data storage unit 12 stores includes the relative position of the sign to any direction of the road. The relative position of the sign that the sign recognition unit 11 detects in the video is a relative position of the detected sign to the road on which the vehicle travels, in the traveling direction of the vehicle, for example. In the following description, the relative position of the sign that the sign recognition unit 11 detects in the video to the road on which the vehicle travels is simply referred to as "the relative position of the detected sign". In addition, the relative position of the sign extracted from the sign data to the road at which the sign targets is simply referred to as "the relative position of the extracted sign". When the relative position of the detected sign and the relative position of the extracted sign correspond, the sign position determination unit 13 may determine that the detected sign and the extracted sign conform.

As described above, in the present exemplary embodiment, the map data storage unit 12 stores the road data including the position of the starting point and the position of the ending point of the road. In addition, the map data storage unit 12 stores the relative position of the sign to the road at which the sign targets, in the direction from the starting point to the ending point of the road, as at least a part of the sign data, for example. When an angle between the direction from the starting point to the ending point of the road at which the sign targets and the traveling direction of the vehicle does not exceed 90 degrees, the sign position determination unit 13 may estimate the relative position that the map data storage unit 12 includes as the relative position in the traveling direction of the vehicle. In this case, if the relative position of a certain sign that the map data storage unit 12 stores is "left", for example, the relative position of the sign in the traveling direction of the vehicle is estimated as "left". When the angle between the direction from the starting point to the ending point of the road at which the sign targets and the traveling direction of the vehicle exceeds 90 degrees, the sign position determination unit 13 may estimate the relative position obtained by reversing the relative position that the map data storage unit 12 includes as the relative position in the traveling direction of the vehicle. In this case, if the relative position of a certain sign that the map data storage unit 12 stores is "left", for example, the relative position of the sign in the traveling direction of the vehicle is estimated as "right".

As described above, the sign position determination unit 13 of the present exemplary embodiment retrieves the relative position of the map coordinates extracted in Step S107 and Step S108 to the road at which the map coordinate targets, from the map data storage unit 12. Then, the sign position determination unit 13 determines that the map sign whose relative position corresponds to the relative position of the detected sign to the road on which the vehicle travels conforms to the detected sign. As described above, the map signs extracted by the sign detection unit 11 in Step S107 are map signs arranged at a place within a prefixed distance from the measured position of the vehicle. The map signs extracted by the sign detection unit 11 in Step S108 are map signs having the same type as that of the detected sign detected by the sign recognition unit 11, among the signs extracted in Step S107. Furthermore, when the side on which the detected sign exists with respect to the road on which the vehicle, to which the imaging device 2 that images the video is mounted, travels and the side on which the map sign exists with respect to the road at which the map sign targets are the same, the sign position determination unit 13 determines that the detected sign and the map sign conform.

By determining whether or not the sign whose data is retrieved from the map data storage unit 12 conforms to the detected sign, the sign position determination unit 13 determines whether or not the detected sign is a sign that targets at the road on which the vehicle travels. More specifically, when the sign whose data is retrieved from the map data storage unit 12 conforms to the detected sign, the sign position determination unit 13 determines that the detected sign is a sign that targets at the road on which the vehicle travels. In addition, when the sign whose data is retrieved from the map data storage unit 12 does not conform to the detected sign, the sign position determination unit 13 determines that the detected sign is not a sign that targets at the road on which the vehicle travels.

When the sign that conforms to the detected sign does not exist (No in Step S110), the processing of the driving support device 1 returns to Step S101.

In the examples of FIG. 5 and FIG. 6, the relative position included in the sign data indicates a relative position to the road at which the sign data targets, in the traveling direction of the vehicle.

In the sign data shown in FIG. 6, the relative position of the sign to the road at which the sign targets is "right". The sign represented by the sign data of FIG. 6 is arranged on the right side with respect to the road at which the sign targets.

For example, when the vehicle travels on the road 202 of FIG. 4 in the direction from the lower side to the upper side of FIG. 4, the relative position of the sign to the road on which the vehicle travels is "left". In this case, the sign of FIG. 6 and the sign detected by the sign recognition unit 11 do not conform.

In contrast, when the vehicle travels on the road 201 of FIG. 4 in the direction from the lower side to the upper side of FIG. 4, the relative position of the sign to the road on which the vehicle travels is "right". In this case, the sign of FIG. 6 and the sign detected by the sign recognition unit 11 conform.

When the sign that conforms to the detected sign exists (Yes in Step S110), the output unit 14 outputs information that the detected sign represents (Step S111).

The output unit 14 converts audio data that is correlated to the type of the detected sign to an audio and outputs the audio to the output device 3 that is an audio output device, such as a speaker, mounted to the vehicle. Alternatively, the output unit 14 may make the output device 3 that is a display device mounted to the vehicle display a video or an image which is correlated to the type of the detected sign, for example. The output unit 14 may output a combination of an audio and a video or an image to the output device 3. A storage unit of the driving support device 1, which is not shown in the drawing, may store audio data, and data of a video or an image, which is correlated to the type of the sign. By outputting information that the detected sign represents, the output unit 14 notifies a driver of the vehicle of the information that the detected sign represents. The output unit 14 may further output the road ID of the road at which the sign conforming to the detected sign targets. The output unit 14 may output the road map that the road ID represents, in place of the road ID.

In the above-described description of the present exemplary embodiment, the relative position is an arrangement position of the sign, which is represented by "right" or "left" with respect to the road, in the traveling direction of the vehicle, for example. However, the relative position may be a position represented by other methods.

For example, the relative position may be an orientation of the arrangement position of the sign relative to the road. The orientation in this case is a direction of a perpendicular line of the road toward the arrangement position of the sign from the road, for example. In addition, the orientation may be represented by a finite number of orientations that are divided by a range of a prefixed angle. For example, the orientation may be represented by any of north, south, east, and west. In this case, the position measurement unit 15 further measures an orientation of the front direction of the vehicle, as an orientation of the road on which the vehicle travels, for example. In addition, the sign recognition unit 11 further calculates an angle of the detected sign with respect to the front direction of the vehicle. In addition, the sign recognition unit 11 calculates a distance from the imaging device 2 to the sign, on the basis of a diameter when the detected sign is in a standard size, a diameter of the sign in the video, and a camera parameter of the imaging device 2, for example. Then, the sign position determination unit 13 calculates an orientation of the detected sign with respect to the position of the vehicle, on the basis of the orientation of the front direction of the vehicle, the angle of the detected sign with respect to the front direction of the vehicle, and the distance from the imaging device 2 to the sign. In addition, the map data storage unit 12 may store the direction of a perpendicular line of the road toward the arrangement position of the sign from the road, as the relative position of the sign to the road at which the sign targets.

The present exemplary embodiment described above has an effect of being capable of selectively outputting information of a sign that targets at a road on which a vehicle travels when the vehicle approaches a sign arranged in the vicinity of a plurality of roads.

The reason is that the sign position determination unit 13 determines conformity of the relative position of the sign detected from the video that the imaging device 2 images to the road on which the vehicle travels and the relative position of the sign that the map data storage unit 12 stores to the road at which the sign targets. The relative position of the sign to the road indicates whether the sign is arranged on the right side or arranged on the left side of the road in the traveling direction of the vehicle that travels on the road, for example. Then, when the conformity of the above-described two relative positions is determined, the output unit 14 outputs the information that the sign detected from the video represents.

For example, when a sign is arranged on the right side of a road at which the sign targets and a vehicle travels on a road adjacent to the right side of the sign, an image of the sign is included in a video of the imaging device 2 mounted to the vehicle. When information of all signs detected from the video of the imaging device 2 is outputted, if the sign is included in the imaged range of the imaging device 2, even information of a sign that does not target at the road on which the vehicle travels is outputted. However, a map sign whose relative position conforms to the detected sign does not exist, the road that is a target of the detected sign is not the road on which the vehicle travels. The sign position determination unit 13 of the present exemplary embodiment determines whether or not a map sign whose relative position conforms to the detected sign exists. Then, when a map sign whose relative position conforms to the detected sign exists, the output unit 14 of the present exemplary embodiment outputs information that the sign represents. When a map sign whose relative position conforms to the detected sign does not exist, the output unit 14 of the present exemplary embodiment does not output information that the detected sign represents. Accordingly, the driving support device 1 of the present exemplary embodiment can suppress output of information of a sign that does not target at the road on which the vehicle travels. The driving support device 1 of the present exemplary embodiment can selectively output information of a sign that targets at the road on which the vehicle travels.

Second Exemplary Embodiment

Next, a second exemplary embodiment of the present invention will be described in detail with reference to the drawings.

FIG. 1 is a diagram illustrating a structure of the driving support system 100 of the present exemplary embodiment. The structure of the driving support system 100 of the present exemplary embodiment is the same as the structure of the driving support system 100 of the first exemplary embodiment. Hereinafter, differences of the present exemplary embodiment from the first exemplary embodiment will be mainly described.

In the present exemplary embodiment, the relative position includes a distance between the sign and the road in addition to the relative position of the first exemplary embodiment. The distance between the sign and the road is the shortest distance between the sign and a center line of the road, for example. The distance between the sign and the road may be the shortest distance between the sign and a region of the road, for example. The distance between the sign and the road may be a value that is measured by other methods and represents closeness between the sign and the road.

FIG. 7 is a diagram illustrating an example of arrangement of a road and a sign.

In the example shown in FIG. 7, a road 602 and a road 603 exist. A sign 601 that targets the road 603 is arranged on the roadside of the left side of the road 603. A distance between the road 603 and the sign 601 is a distance 604.

The sign recognition unit 11 of the present exemplary embodiment calculates a distance between the road on which the vehicle travels and the sign, as the relative position of the detected sign to the road on which the vehicle travels, in addition to the relative position in the first exemplary embodiment. The sign recognition unit 11 calculates a distance between the center line of the road on which the vehicle travels and the arrangement position of the sign, as the distance between the road on which the vehicle travels and the sign, for example. However, in the present exemplary embodiment, the sign recognition unit 11 calculates a distance between the optical axis of the imaging device 2 and the arrangement position of the sign, as an approximate value of the distance between the center line of the road on which the vehicle travels and the arrangement position of the sign. More specifically, the sign recognition unit 11 calculates the distance between the optical axis of the imaging device 2 and the arrangement position of the sign, as a distance included in the relative position of the detected sign, that is, the distance between the road on which the vehicle travels and the sign. The sign recognition unit 11 may calculate other values that represent closeness between the road on which the vehicle travels and the sign, as the distance between the road on which the vehicle travels and the sign.

In addition, the map data storage unit 12 of the present exemplary embodiment stores a distance between the road at which the sign targets and the sign, as the relative position of the sign relative to the road at which the sign targets, in addition to the relative position of the first exemplary embodiment. As described above, the distance between the road and the sign is, for example, the distance between the center line of the road and the sign. When there are a plurality of roads that are targets of a sign, for a plurality of signs, the map data storage unit 12 may store all distances to the respective roads at which the sign targets.

FIG. 8 is a diagram illustrating an example of sign data that the map data storage unit 12 stores. Referring to FIG. 8, the map data storage unit 12 of the present exemplary embodiment stores "direction" that corresponds to the relative position of the first exemplary embodiment and "distance" that represents the distance between the sign and the road at which the sign targets, as the relative position.

Other components of the present exemplary embodiment are the same as the components of the first exemplary embodiment, which are denoted by the same reference numerals.

Next, an operation of the driving support device 1 of the present exemplary embodiment will be described in detail with reference to the drawings.

Figure 9:
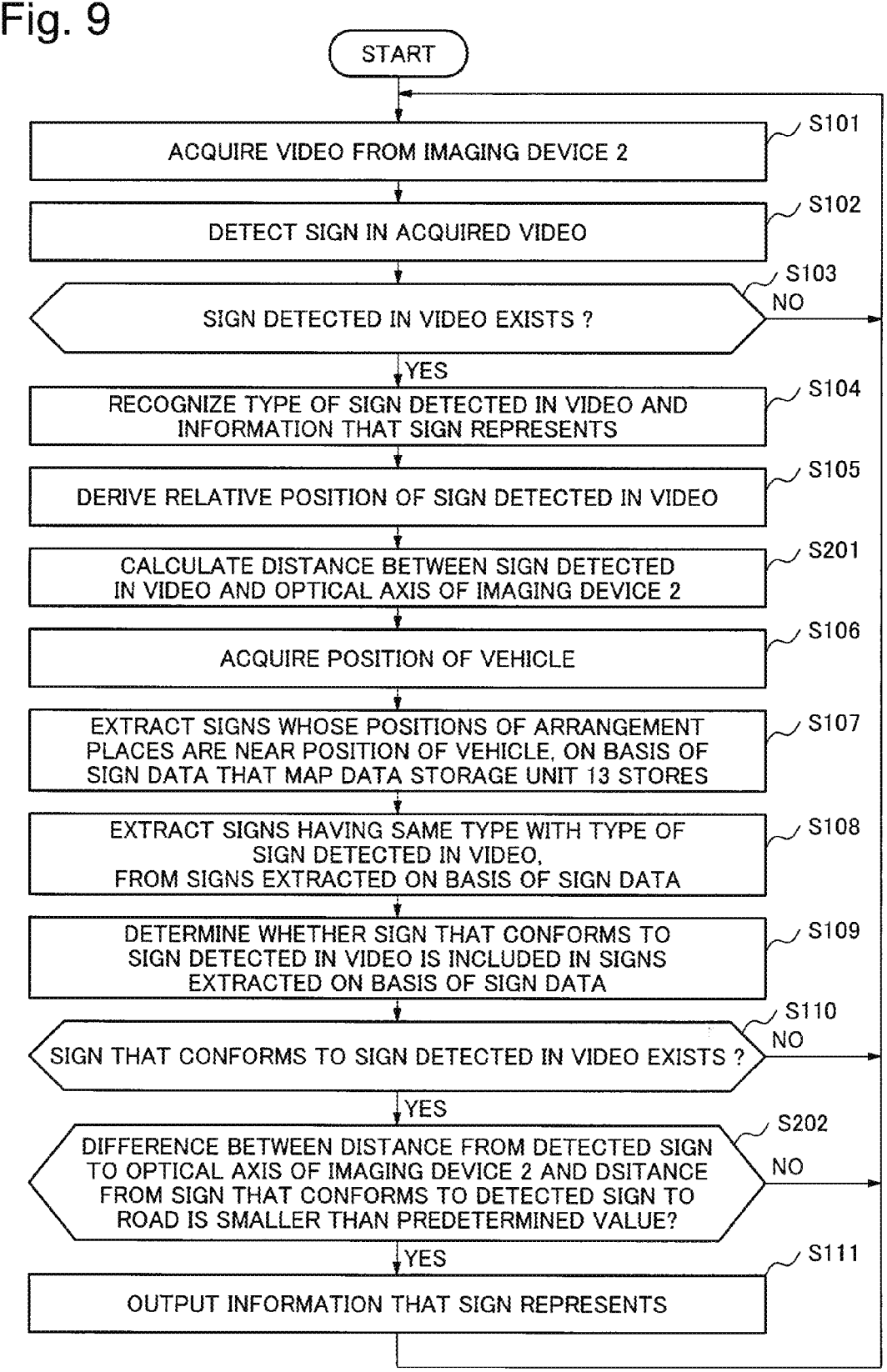
FIG. 9 is a flowchart illustrating an example of an operation of the driving support device 1 of the second exemplary embodiment.

FIG. 9 is a flowchart illustrating the operation of the driving support device 1 of the present exemplary embodiment.

The operations from Step S101 to Step S105 of the driving support device 1 of the present exemplary embodiment are the same as the operations of Steps having the same codes of the driving support device 1 of the first exemplary embodiment, respectively.

After the operation of Step S105, the sign recognition unit 11 calculates a distance between the optical axis of the imaging device 2 and the arrangement position of the sign (Step S201). The distance between the optical axis of the imaging device 2 and the arrangement position of the sign is the shortest distance between the optical axis of the imaging device 2 and the arrangement position of the sign.

Figure 10:
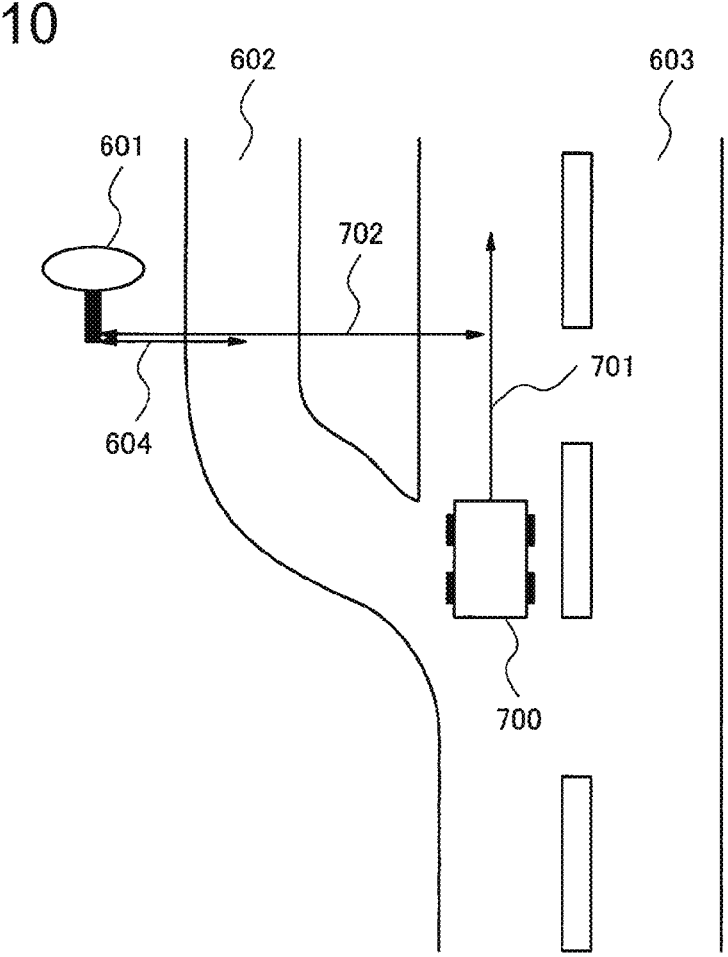
FIG. 10 is a diagram illustrating an example of a sign, a road, and a vehicle that travels on the road.

FIG. 10 is a diagram illustrating an example of a sign, a road, and a vehicle that travels on the road.

In the example of FIG. 10, a vehicle 700 travels on the road 603. In addition, the sign 601 is arranged on the left side of the road 602 that branches off from the road 603. The distance between the sign 601 and the road 602 is the distance 604. In addition, a distance between an optical axis 701 of the imaging device 2 that the vehicle 700 mounts and the sign 601 is a distance 702.

Figure 11:
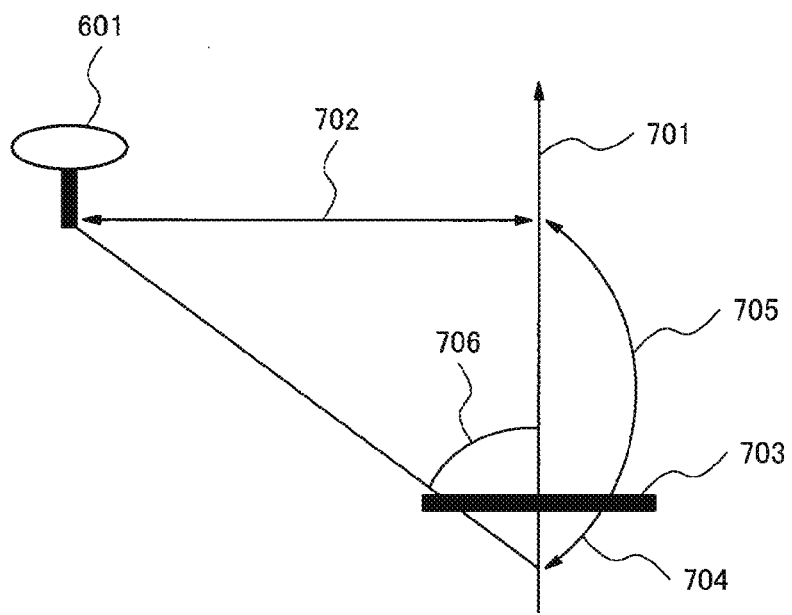
FIG. 11 is a diagram illustrating an example of a relationship between a sign 601 and an imaging device 2.

FIG. 11 is a diagram illustrating an example of a relationship between the sign 601 and the imaging device 2.

In the example of FIG. 11, a distance between a plane passing through the sign 601 and perpendicular to the optical axis 701 of the imaging device 2 and a camera center 704 is a distance 705. In addition, an angle between the optical axis 701 of the imaging device 2 and a straight line through the camera center 704 and the sign 601 is an angle 706. An image of the sign 601 exists on an image plane 703 of the imaging device 2.

The imaging device 2 of the present exemplary embodiment may be configured so as to include a stereo camera whose internal parameters are known. When the imaging device 2 includes such a stereo camera in the structure, the sign recognition unit 11 calculates a three-dimensional position of the sign in a camera coordinate system, on the basis of a video by the stereo camera, using any of existing methods based on a stereoscopic principle. As a method of calculating the three-dimensional position of the sign in the camera coordinate system, a variety of existing methods are applicable. The sign recognition unit 11 calculates a distance from the optical axis of the camera to the sign, on the basis of the calculated position of the sign in the camera coordinate system. In this case, the camera coordinate system may be a coordinate system based on any of cameras with which the stereo camera is composed. The optical axis of the camera may be an optical axis of any of cameras with which the stereo camera is composed.

The imaging device 2 may be configured so as to include one camera whose internal parameters are known. When the imaging device 2 includes such one camera in the structure, the sign recognition unit 11 calculates a distance between the optical axis of the camera and the sign, on the basis of a standard size of the detected sign, a size of the detected sign on a video, and the internal parameters of the camera of the imaging device 2. A method of calculating the distance between the optical axis of the camera and the sign by the sign recognition unit 11 may be any of existing methods based on a figure similarity principle, for example. In the case of the example of FIG. 11, the sign recognition unit 11 estimates the distance 705 from the camera to the traffic sign, on the basis of the standard size of the detected sign, the size of the detected sign on the video, and the internal parameters of the camera of the imaging device 2. In addition, the sign recognition unit 11 calculates a tangent of the angle 706, from a horizontal position of the detected sign on the video. Then, the sign recognition unit 11 estimates the distance 702 from the optical axis 701 to the sign 601 by multiplying the tangent of the angle 706 by the distance 705.

The operations from Step S106 to Step S110 of the driving support device 1 of the present exemplary embodiment are the same as the operations of Steps having the same codes of the driving support device 1 of the first exemplary embodiment, respectively.

When the sign that conforms to the detected sign exists (Yes in Step S110), the output unit 14 compares a distance between the detected sign and the optical axis of the imaging device 2 with a distance from the sign that conforms to the detected sign to the road at which the sign targets.

When a difference between the distance between the detected sign and the optical axis of the imaging device 2 and the distance from the sign that conforms to the detected sign to the road at which the sign targets is equal to or more than a preset value (No in Step S202), the operation of the driving support device 1 returns to Step S101.

When the difference between the distance between the detected sign and the optical axis of the imaging device 2 and the distance from the sign that conforms to the detected sign to the road at which the sign targets is less than the preset value (Yes in Step S202), the output unit 14 outputs information that the detected sign represents (Step S111).

The above-described preset value is a threshold value for the difference between the distance between the detected sign and the optical axis of the imaging device 2 and the distance from the sign that conforms to the detected sign to the road at which the sign targets. The above-described preset value, that is, the threshold value may not be a constant value. For example, for a plurality of signs, the map data storage unit 12 may store a distance to the nearest road to the sign among the roads at which the sign targets, and the threshold value. The threshold value may be, for example, a value equal to or more than a difference between a distance between the nearest road to the sign and the sign and a distance between the farthest road from the sign and the sign, among the roads at which the sign targets. When comparing the above-described two distances in Step S202, the output unit 14 may retrieve the threshold value relating to the sign from the map data storage unit 12.

The present exemplary embodiment described above has the same effect as that of the first exemplary embodiment. The reason is the same as the reason of the effect of the first exemplary embodiment.

In addition, the present exemplary embodiment has an effect of being capable of more accurately suppressing output of information of a sign that does not target at a road on which a vehicle travels when the vehicle approaches a sign arranged in the vicinity of a plurality of roads, in the case of outputting information of a sign that targets at the road on which the vehicle travels.

The reason is that, when the above-described two relative positions conform, the output unit 14 further compares the distance between the detected sign and the optical axis of the imaging device 2 with the distance from the sign that conforms to the detected sign to the road at which the sign targets, and then, when the difference of the compared two distances is less than the preset value, the output unit 14 outputs information that the detected sign represents.

For example, in the example of FIG. 10, when a road that is a target of the arranged sign 601 is only the road 602, the road 603 is not a target of the sign 601. However, when the sign 601 is included in the imaged range of the imaging device 2 which is mounted on the vehicle traveling on the road 603, the driving support device 1 sometimes detects the sign 601 from the video of the imaging device 2. In addition, the sign 601 is arranged on the left side of the road 602 that is a target of the road 601. Furthermore, the sign 601 is arranged on the left side of the road 603 on which the vehicle travels. Therefore, in such a case, even if the vehicle travels on the road 603 that is not a target of the sign 601, the driving support device 1 of the first exemplary embodiment outputs information of the sign 601.

However, in the case where the vehicle travels on the road 603, the difference between the distance between the optical axis of the imaging device 2 mounted on the vehicle and the sign 601 and the distance between the road 602 at which the sign 601 targets and the sign 601 is larger compared to the case where the vehicle travels on the road 602. Therefore, when the difference of the compared two distances is less than the predetermined value, the output unit 14 outputs information that the detected sign represents, and thus, the driving support device 1 of the present exemplary embodiment can more accurately suppress output of information of a sign that does not target at the road on which the vehicle travels. The preset value may be set in advance such that it is possible to distinguish the above-described difference of the two distances, and to distinguish the case where the vehicle travels on the road that is a target of the sign and other cases. For a plurality of signs, the map data storage unit 12 may store the preset value as the above-described threshold value.

Third Exemplary Embodiment

Next, a third exemplary embodiment of the present invention will be described in detail with reference to the drawings.

FIG. 1 is a diagram illustrating a structure of the driving support system 100 of the present exemplary embodiment. The structure of the driving support system 100 of the present exemplary embodiment is the same as the structure of the driving support system 100 of the first exemplary embodiment. Hereinafter, differences of the present exemplary embodiment from the first exemplary embodiment will be mainly described.

The relative position of the present exemplary embodiment is the same as the first exemplary embodiment.

The sign recognition unit 11 of the present exemplary embodiment further calculates a distance between the detected sign and the imaging device 2.

For each of the signs in which a branch point whose distance from the sign is within a preset distance exists on a road at which the sign targets, the map data storage unit 12 of the present exemplary embodiment further stores a distance between the branch point of the road at which the sign targets and the sign. When a plurality of branch points exist on the road at which the sign targets, the map data storage unit 12 may store a distance to the branch point nearest to the sign among those branch points. In addition to the distance between the branch point and the sign, the map data storage unit 12 may store coordinates of the branch point. When a plurality of branch points exist on the road at which the sign targets, for the sign, the map data storage unit 12 may store coordinates of the branch point nearest to the sign and a distance from the branch point to the sign, in each direction of the road with the sign as the center. When the map data storage unit 12 stores, for a road that is not a one-way road, road data for the respective vehicle traveling directions as that of different roads, the map data storage unit 12 may store a distance between the sign and a branch point that exists in a direction where the vehicle approaches the sign, and coordinates of the branch point.

Figure 12:
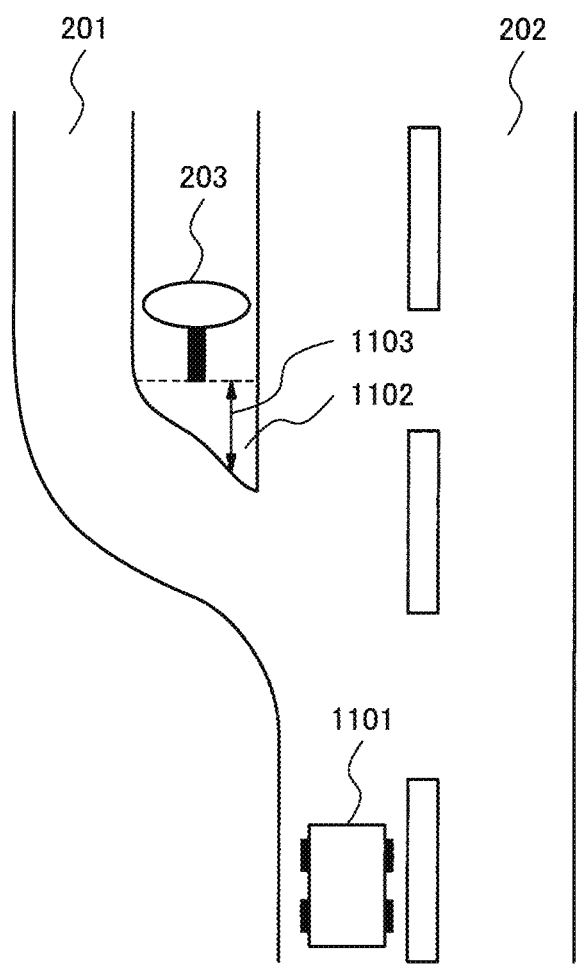
FIG. 12 is a diagram illustrating an example of arrangement of a road and a sign.

FIG. 12 is a diagram illustrating an example of arrangement of a road and a sign.

In the example shown in FIG. 12, the road 201 and the road 202 branch off at a branch point 1102. In addition, a distance from the branch point 1102 to the sign 203 is a distance 1103.

Other components of the present exemplary embodiment are the same as the components of the first exemplary embodiment, which are denoted by the same reference numerals.

Next, an operation of the present exemplary embodiment will be described in detail with reference to the drawings.

Figure 13:
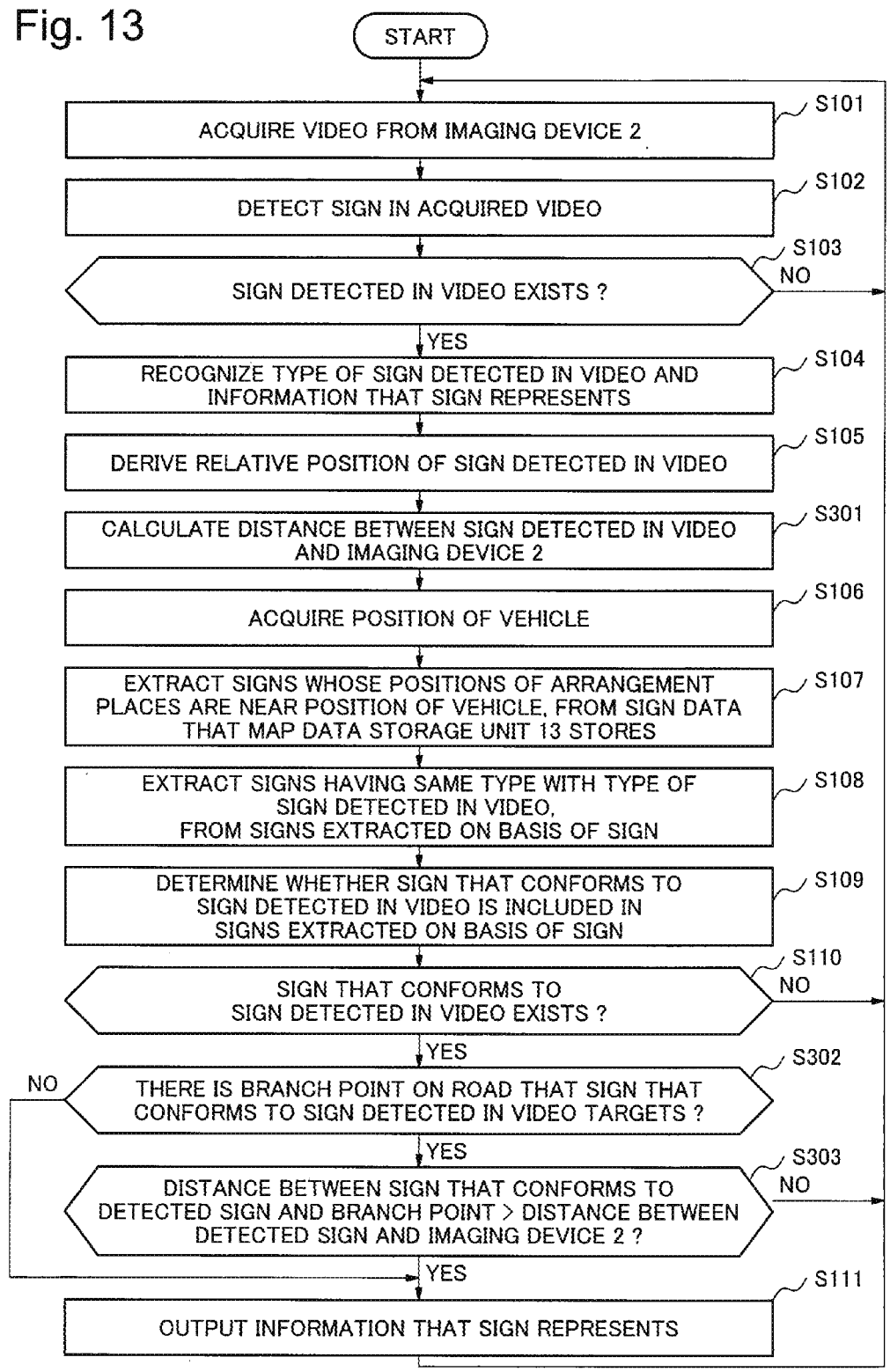
FIG. 13 is a flowchart illustrating an operation of the driving support device 1 of the third exemplary embodiment.

FIG. 13 is a flowchart illustrating the operation of the driving support device 1 of the present exemplary embodiment.

The operations from Step S101 to Step S105 of the driving support device 1 of the present exemplary embodiment are the same as the operations of Steps having the same codes of the driving support device 1 of the first exemplary embodiment, respectively.

After the operation of Step S105, the sign recognition unit 11 calculates a distance between the imaging device 2 and the arrangement position of the sign (Step S301).

The sign recognition unit 11 may calculate a distance between the camera center of the imaging device 2 and the arrangement position of the sign, as the distance between the imaging device 2 and the arrangement position of the sign. The sign recognition unit 11 calculates the distance between the imaging device 2 and the arrangement position of the sign by the same method as the operation of Step S201 of the second exemplary embodiment.

The operations from Step S106 to Step S110 of the driving support device 1 of the present exemplary embodiment are the same as the operations of Steps having the same codes of the driving support device 1 of the first exemplary embodiment, respectively.

When the sign that conforms to the detected sign exists (Yes in Step S110), the output unit 14 determines the presence or absence of a branch point on a road at which the sign that conforms to the detected sign targets (Step S302).

When the map data storage unit 12 stores, for the sign that conforms to the detected sign, a distance to a branch point, the output unit 14 may determine that there is a branch point on the road at which the sign that conforms to the detected sign targets. When the map data storage unit 12 does not store, for the sign that conforms to the detected sign, a distance to a branch point, the output unit 14 may determine that there is not a branch point on the road at which the sign that conforms to the detected sign targets.

The output unit 14 may determine whether or not the branch point is located at a farther place, from the position of the vehicle, than the sign on the basis of the position of the sign that conforms to the detected sign, the position of the branch point, and the position of the vehicle, which the position measurement unit 15 measures. In this case, when the branch point is nearer than the sign from the position of the vehicle, the output unit 14 may determine that the branch point exists.

When there is not the branch point on the road at which the sign that conforms to the detected sign targets (No in Step S302), the operation of the driving support device 1 proceeds to Step S111.

When there is not the branch point on the road at which the sign that conforms to the detected sign targets (Yes in Step S302), the operation of the driving support device 1 proceeds to Step S303.

The output unit 14 compares a distance between the detected sign and the imaging device 2 with a distance between the sign that conforms to the detected sign and the branch point of the road at which the sign targets (Step S303).

When the distance between the detected sign and the imaging device 2 is larger than the distance between the sign that conforms to the detected sign and the branch point of the road at which the sign targets (No in Step S303), the operation of the driving support device 1 returns to Step S101.

When the distance between the detected sign and the imaging device 2 is equal to or less than the distance between the sign that conforms to the detected sign and the branch point of the road at which the sign targets (Yes in Step S303), the output unit 14 outputs information that the detected sign represents (Step S111).

In the present exemplary embodiment, the relative position may further include a distance between the sign and the road, as is the case with the second exemplary embodiment. The distance between the sign and the road is, for example, the shortest distance between the sign and a center line of the road.

The sign recognition unit 11 of the present exemplary embodiment may calculate a distance between the center line of the road on which the vehicle travels and the arrangement position of the sign, as the relative position of the detected sign to the road on which the vehicle travels, in addition to the relative position of the first exemplary embodiment, as is the case with the sign recognition unit 11 of the second exemplary embodiment.

In addition, the map data storage unit 12 of the present exemplary embodiment may store a distance between the center line of the road at which the sign targets and the sign, as the relative position of the sign to the road at which the sign targets, in addition to the relative position of the first exemplary embodiment, as is the case with the map data storage unit 12 of the second exemplary embodiment.

The sign recognition unit 11 may perform the operation of Step S201 of FIG. 9 with the operation of Step S301, in place of Step S301 of FIG. 13.

In addition, the output unit 14 of the present exemplary embodiment may perform the operation of Step S202 of FIG. 9 between Step S110 and Step S302 of FIG. 13.

The present exemplary embodiment described above has the same effect as that of the first exemplary embodiment. The reason is the same as the reason of the effect of the first exemplary embodiment.

In addition, the present exemplary embodiment has an effect of being capable of more accurately suppressing output of information of a sign that does not target a road on which a vehicle travels when the vehicle approaches a sign arranged in the vicinity of a plurality of roads, in the case of outputting information of a sign that targets at the road on which the vehicle travels.

The reason is that, when the distance between the detected sign and the imaging device 2 is equal to or less than the distance between the sign that conforms to the detected sign and the branch point of the road at which the sign targets, the output unit 14 outputs information that the detected sign represents.

When the road branches in front of the vehicle that travels on the road, the driving support device 1 cannot determine whether the vehicle goes to any of the branch roads until the vehicle passes the branch point. In the case of outputting the information that the detected sign represents before the vehicle passes the branch point, information of a sign that targets at a road to which the vehicle does not go is sometimes outputted.

For example, in the example shown in FIG. 12, the driving support device 1 cannot determine whether the vehicle 1101 goes to either the road 201 or the road 202 until the vehicle 1101 passes the branch point 1102. When a road that is a target of the sign 203 is only the road 202, the vehicle that goes to the road 201 from the road 202 is not regulated by the sign 203. In contrast, before the vehicle 1101 passes the branch point 1102, the sign 203 is sometimes detected from the video of the imaging device 2 mounted to the vehicle 1101. When the output unit 14 outputs information of the sign 203 detected before the vehicle 1101 passes the branch point 1102, the output unit 14 may output the information of the sign 203 for the vehicle 1101 going to the road 201 that is not a target of the sign 203.

However, as described above, in the present exemplary embodiment, when the distance between the detected sign and the imaging device 2 is equal to or less than the distance between the sign that conforms to the detected sign and the branch point of the road at which the sign targets, the output unit 14 outputs information that the detected sign represents. Therefore, the output unit 14 does not output the information of the sign 203 for the vehicle 1101 going to the road 201 that is not a target of the sign 203. Accordingly, when a vehicle approaches a sign arranged in the vicinity of a plurality of roads, in the case of outputting information of a sign that targets at a road on which the vehicle travels, the driving support device 1 of the present exemplary embodiment can more accurately suppress output of information of a sign that does not target at the road on which the vehicle travels.

Fourth Exemplary Embodiment

Next, a fourth exemplary embodiment of the present invention will be described in detail with reference to the drawings.

Figure 14:
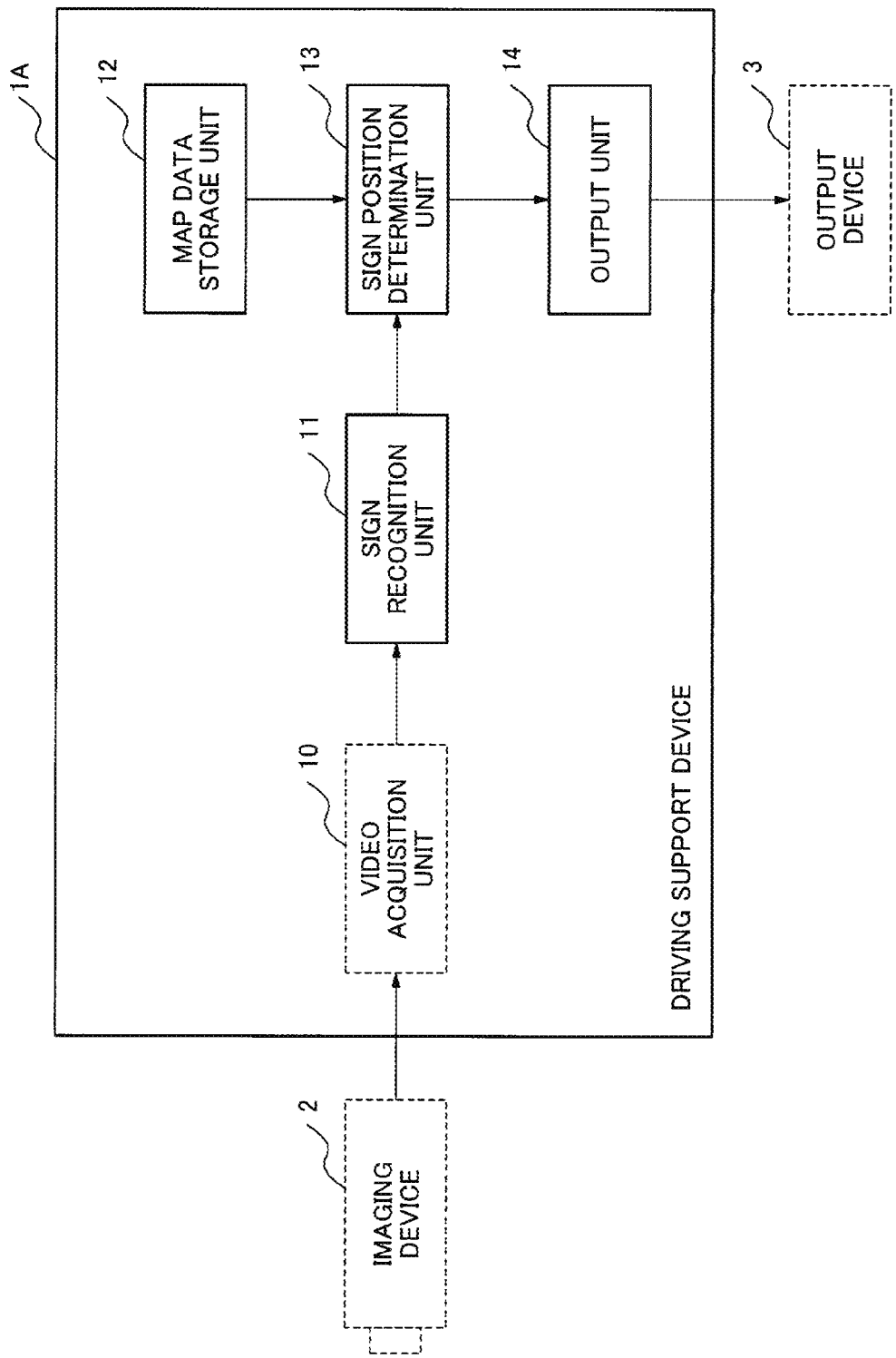
FIG. 14 is a diagram illustrating an example of a structure of a driving support device 1A of a fourth exemplary embodiment.

FIG. 14 is a diagram illustrating a structure of a driving support device 1 of the present exemplary embodiment.

Referring to FIG. 14, the driving support device 1 of the present exemplary embodiment includes the video acquisition unit 10, the sign recognition unit 11, the map data storage unit 12, the sign position determination unit 13, and the output unit 14. The video acquisition unit 10 acquires a video from the imaging device 2 mounted to a vehicle that travels on a road. The sign recognition unit 11 detects a sign from the video, and recognizes information represented by a detected sign that is the sign detected and a first relative position that is a relative position of the detected sign to the road. The map data storage unit 12 stores a second relative position that is a relative position of the sign to the road. The sign position determination unit 13 determines conformity of the detected sign and a map sign that is the sign whose second relative position is stored in the map data storage unit 12, by determining if the second relative position and the first relative position conform. The output unit 14 outputs the information that the detected sign represents, when it is determined that the detected sign and the map sign conform.

The present exemplary embodiment described above has the same effect as the effect of the first exemplary embodiment. The reason is the same as the reason of the effect of the first exemplary embodiment.

Each of the driving support device 1 and the driving support device 1A can be achieved by a computer and a program that controls the computer, dedicated hardware, or a combination of a computer and a program that controls the computer and dedicated hardware.

Figure 15:
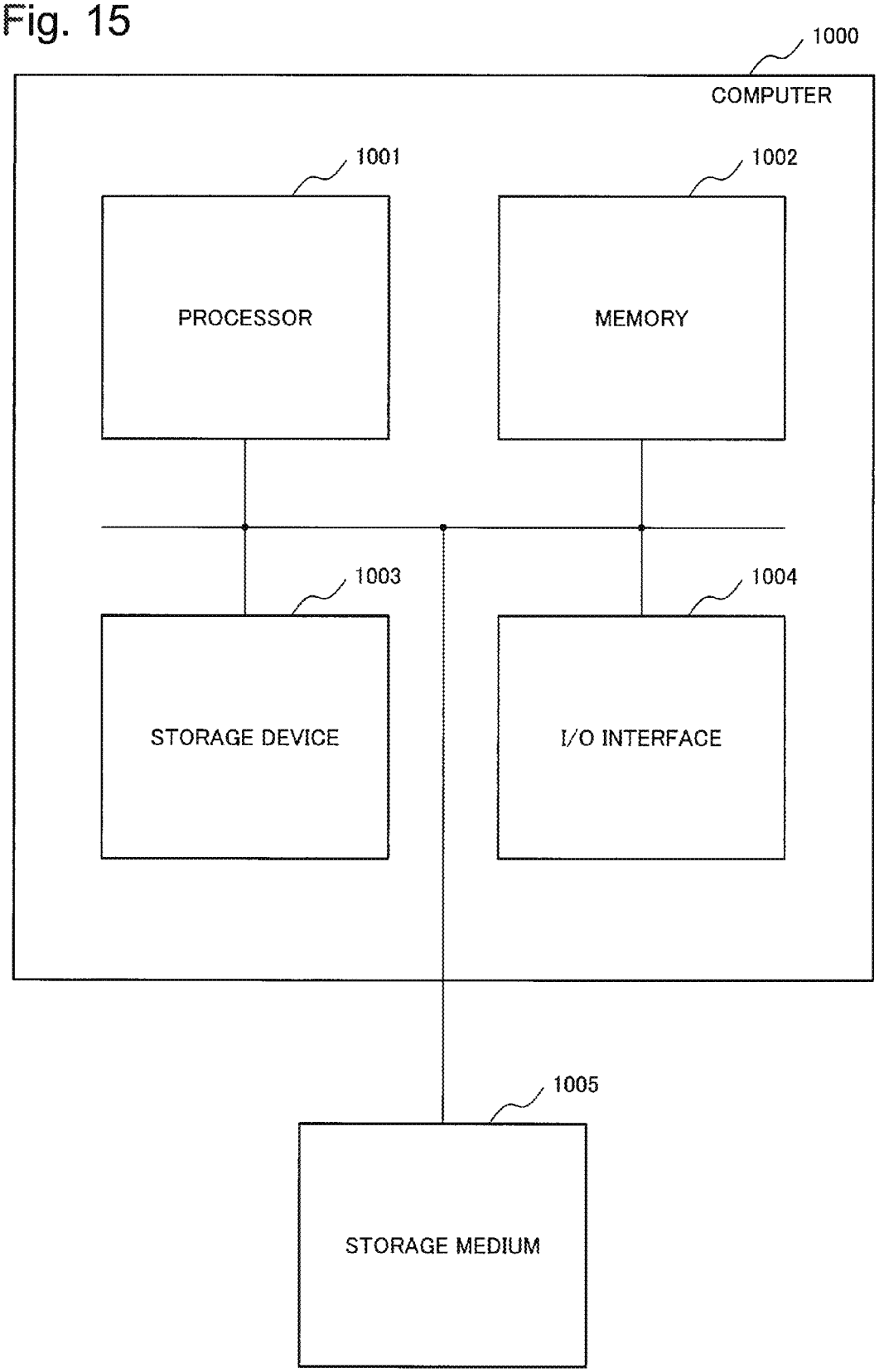
FIG. 15 is a diagram illustrating an example of a structure of a computer 1000 used for achieving the driving support device 1 and the driving support device 1A.

FIG. 15 is a diagram illustrating an example of a structure of a computer 1000 used for achieving the driving support device 1 and the driving support device 1A. Referring to FIG. 15, the computer 1000 includes a processor 1001, a memory 1002, a storage device 1003, and an I/O (Input/Output) interface 1004. In addition, the computer 1000 can access a recording medium 1005. The memory 1002 and the storage device 1003 are storage devices such as a RAM (Random Access Memory) or a hard disk, for example. The recording medium 1005 is a RAM, a storage device such as a hard disk, a ROM (Read Only Memory), or a portable recording medium, for example. The storage device 1003 may be the recording medium 1005. The processor 1001 can perform reading/writing of data or a program for the memory 1002 and the storage device 1003. The processor 1001 can access the imaging device 2 and the output device 3 through the I/O interface 1004, for example. The processor 1001 can access the recording medium 1005. In the recording medium 1005, a program that makes the computer 1000 operate as the driving support device 1 or the driving support device 1A is stored.

The processor 1001 loads the program that makes the computer 1000 operate as the driving support device 1 or the driving support device 1A, which is stored in the recording medium 1005, into the memory 1002. Then, the processor 1001 executes the program loaded into the memory 1002 so that the computer 1000 operates as the driving support device 1 or the driving support device 1A.

The video acquisition unit 10 can be achieved by a dedicated program achieving a function of the unit, which is read into a memory from a recording medium that stores a program, and a processor that executes the program, for example. The sign recognition unit 11 can be achieved by a dedicated program achieving a function of the unit, which is read into a memory from a recording medium that stores a program, and a processor that executes the program, for example. The sign position determination unit 13 can be achieved by a dedicated program achieving a function of the unit, which is read into a memory from a recording medium that stores a program, and a processor that executes the program, for example. The output unit 14 can be achieved by a dedicated program achieving a function of the unit, which is read into a memory from a recording medium that stores a program, and a processor that executes the program, for example. The position measurement unit 15 can be achieved by a dedicated program achieving a function of the unit, which is read into a memory from a recording medium that stores a program, and a processor that executes the program, for example. The position estimation unit 16 can be achieved by a dedicated program achieving a function of the unit, which is read into a memory from a recording medium that stores a program, and a processor that executes the program, for example. In addition, the map data storage unit 12 can be achieved by a memory and a hard disk device that a computer includes. Alternatively, a part or all of the video acquisition unit 10, the sign recognition unit 11, the map data storage unit 12, the sign position determination unit 13, the output unit 14, the position measurement unit 15, and the position estimation unit 16 can be achieved by a dedicated circuit achieving a function of the respective units.

Heretofore, the present invention was described with reference to the exemplary embodiments, but the present invention is not limited to the above-described exemplary embodiments. With respect to the configuration and details of the present invention, various changes which those skilled in the art can understand may be made within the scope of the present invention.

This application claims priority to Japanese Patent Application No. 2013-013312 filed on Jan. 28, 2013, the entire contents of which are incorporated by reference herein.

REFERENCE SIGNS LIST

1, 1A driving support device
2 imaging device
3 output device
10 video acquisition unit
11 sign recognition unit
12 map data storage unit
13 sign position determination unit
14 output unit
15 position measurement unit
16 position estimation unit
100 driving support system
201, 202, 602, 603 road
203, 601 sign
604, 702, 705, 1103 distance
700, 1101 vehicle
701 optical axis
703 image plane
704 camera center
706 angle
1102 branch point
901 ECU
902 GPS antenna
903 camera
904 CPU
905 signal processing circuit
906 RAM
907 ROM
908 power circuit
1000 computer
1001 processor
1002 memory
1003 storage device
1004 I/O interface
1005 recording medium

What is claimed is:

1. An information processing device comprising:
a sign recognition unit that recognizes a first relative position of a first sign to a road on which a vehicle travels, the first sign being detected in a video acquired from an imaging device mounted to the vehicle, the first relative position indicating a direction of the first sign from a position of the vehicle on the road;
a map data storage unit that stores a second relative position that is a relative position of a second sign to the road; and
an output unit that outputs information represented by the first sign when the first relative position is determined to be consistent with the second relative position stored in the map data storage unit, the second relative position being selected based on the first sign in the video and positional information of the vehicle, wherein
the sign recognition unit determines the first relative position indicating whether the first sign in the video is on a right side or a left side of a preset reference set on the video,
the map data storage unit stores the second relative position in a direction, the second relative position indicating one of the both sides of the road at which the second sign is targeted and
a sign position determination unit estimates a traveling direction of the vehicle, determines a third relative position of the second sign based on the second relative position of the second sign and the estimated traveling direction, the third relative position indicating one of both sides of the road on which the vehicle is traveling, and determines that the second relative position is consistent with the first relative position when the third relative position corresponds to the first relative position.

2. A method executed by an information processing device, the method comprising:
recognizing a first relative position of a first sign to a road on which a vehicle travels, the first sign being detected in a video acquired from an imaging device mounted to the vehicle, the first relative position indicating a direction of the first sign from a position of the vehicle on the road that; and
outputting information represented by the first sign when the first relative position is determined to be consistent with a second relative position that is a relative position of a second sign to the road, the information processing device including a map data storage unit, the second relative position being stored in the map data storage unit and selected based on the first sign in the video and positional information of the vehicle, wherein
the recognizing determines the first relative position indicating whether the first sign in the video is on a right side or a left side of a preset reference set on the video,
the map data storage unit stores the second relative position in a direction, the second relative position indicating one of the both sides of the road at which the second sign is targeted and
estimating a traveling direction of the vehicle, determining a third relative position of the second sign based on the second relative position of the second sign and the estimated traveling direction, the third relative position indicating one of both sides of the road on which the vehicle is traveling, and determines that the second relative position is consistent with the first relative position when the third relative position corresponds to the first relative position.

3. A non-transitory computer readable recording medium storing a program that makes a computer operate as:
a sign recognition unit that recognizes a first relative position of a first sign to a road on which a vehicle travels, the first sign being detected in a video acquired from an imaging device mounted to the vehicle, the first relative position indicating a direction of the first sign from a position of the vehicle on the road; and
an output unit that outputs information represented by the first sign when the first relative position is determined to be consistent with a second relative position that is a relative position of a second sign to the road, the computer including a memory, the second relative position being stored in the memory and selected based on the first sign in the video and positional information of the vehicle, wherein
the sign recognition unit determines the first relative position indicating whether the first sign in the video is on a right side or a left side of a preset reference set on the video,
the map data storage unit stores the second relative position in a direction, the second relative position indicating one of the both sides of the road at which the second sign is targeted and
a sign position determination unit estimates a traveling direction of the vehicle, determines a third relative position of the second sign based on the second relative position of the second sign and the estimated traveling direction, the third relative position indicating one of both sides of the road on which the vehicle is traveling, and determines that the second relative position is consistent with the first relative position when the third relative position corresponds to the first relative position.

4. The information processing device according to claim 1, wherein
the map data storage unit stores road data representing positions of roads, and sign coordinates that are coordinates representing a position of the second sign, and the second relative position to each of the roads at which the second sign is targeted,
the information processing device comprises:
a position measurement unit that measures vehicle coordinates that are coordinates representing a position of the vehicle; and
a position estimation unit that estimates the road on which the vehicle travels, based on the measured vehicle coordinates and the road data,
the sign position determination unit determines if the first sign corresponds to the second sign based on a distance between the sign coordinates of the second sign being targeted at the road on which the vehicle is estimated to travel and the vehicle coordinates, and
the output unit outputs the information that the detected sign represents, when first sign and is determined to correspond to the second sign.

5. The information processing device according to claim 1, wherein,
the map data storage unit further stores a type of the second sign,
the sign recognition unit further determines a type of the first sign from the video, and
the sign position determination unit determines the first sign to correspond to the second sign when the type of the first sign corresponds to the type of the second sign being targeted at the road on which the vehicle is estimated to travel.

6. The information processing device according to claim 1, wherein
- the second relative position includes a second distance that is a shortest distance between a position indicated by the sign coordinates of the second sign and the road that is a target of the second sign,
- the sign recognition unit further estimates a first distance that is a shortest distance between an optical axis of the imaging device and the first sign based on the video, and
- the output unit outputs the information that the first sign represents, when a difference between the second distance of the second sign that corresponds to the first sign and the first distance is equal to or less than a preset value.

7. The information processing device according to claim 1, wherein
- the map data storage unit further stores a position of a branch point of the road, and
- the output unit does not output the information that the first sign represents when the branch point in which a distance between the sign coordinates of the second sign that corresponds to the first sign and the branch point is equal to or less than a sign distance that is a distance between the sign coordinates and the vehicle coordinates exists, and outputs the information that the first sign represents when the branch point in which the distance between the sign coordinates and the branch point is equal to or less than the sign distance does not exist.

8. The method according to claim 2, comprising:
- measuring a vehicle coordinates that is coordinates representing a position of the vehicle;
- estimating a road on which the vehicle travels based on the measured vehicle coordinates and road data representing positions of roads;
- determining if the first sign corresponds to the second sign based on a distance between sign coordinates of the second sign and the vehicle coordinates, the sign coordinates being coordinates representing a position of the second sign; and
- outputting the information that the detected sign represents, when the first sign is determined to correspond to the second sign, wherein
- the map data storage unit stores the road data, the sign coordinates, and the second relative position to each of the roads at which the second sign is targeted.

9. The method according to claim 2, wherein,
- determining a type of the first sign from the video, and
- determining the first sign corresponds to the second sign when the type of the first sign corresponds to a type of the second sign being targeted at the road on which the vehicle is estimated to travel, wherein
- the map storage unit stores the type of the second sign.

* * * * *